Oct. 17, 1961 N. P. S. STRAUSSLER 3,004,619
COLLAPSIBLE MOTOR VEHICLE
Filed Nov. 17, 1958 6 Sheets-Sheet 1
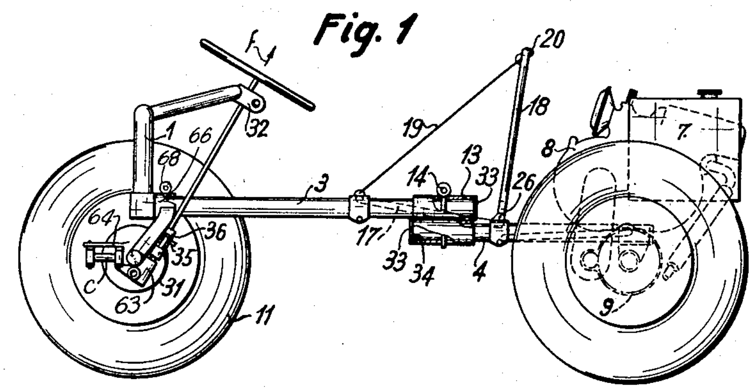
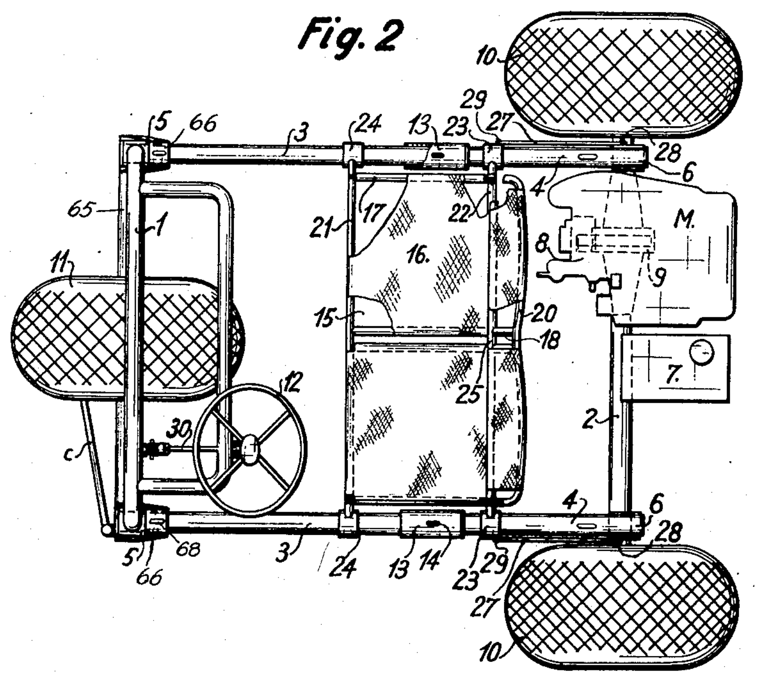
INVENTOR
NICHOLAS PETER SORRELL STRAUSSLER
BY Irwin S. Thompson
ATTY.

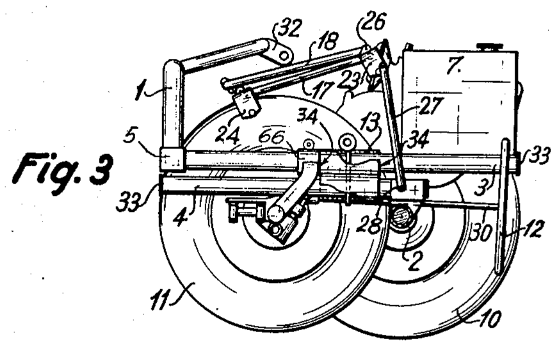
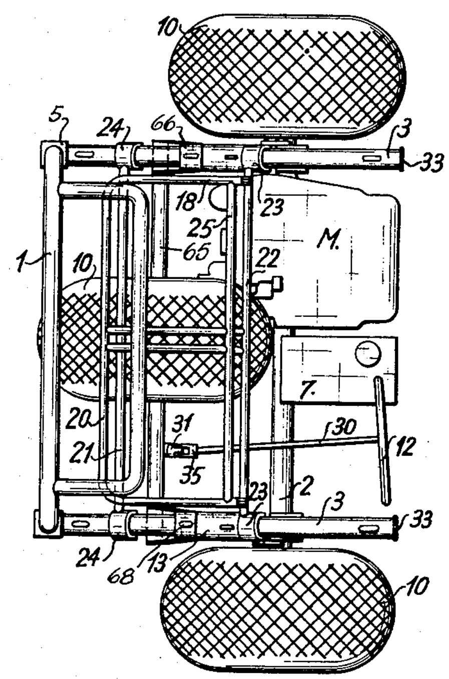
INVENTOR
NICHOLAS PETER
SORRELL STRAUSSLER
BY Irwin S. Thompson
ATTY.

INVENTOR
NICHOLAS PETER
SORRELL STRAUSSLER
BY Irwin S. Thompson
ATTY.

COLLAPSIBLE MOTOR VEHICLE
Filed Nov. 17, 1958 6 Sheets-Sheet 4
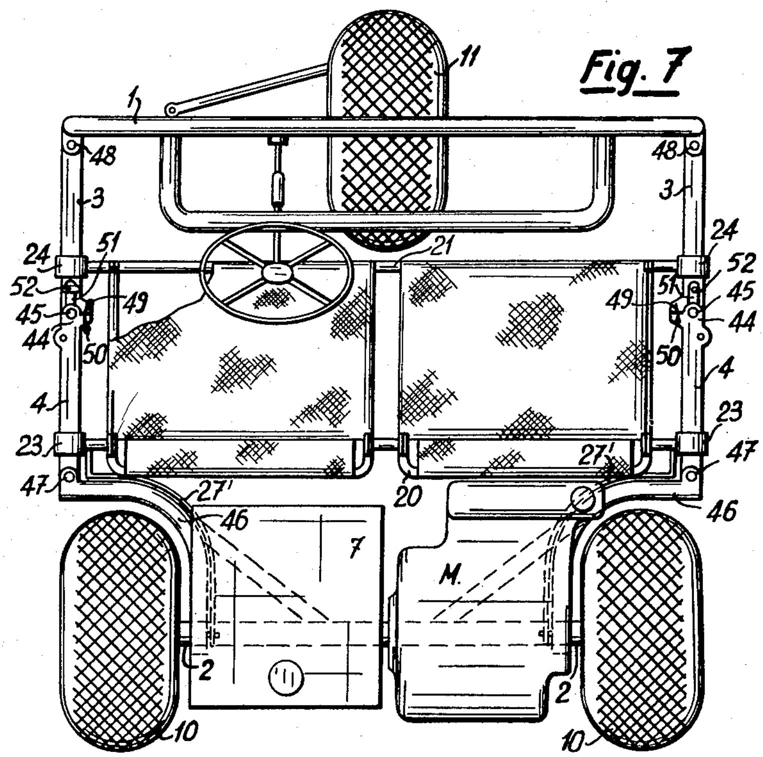
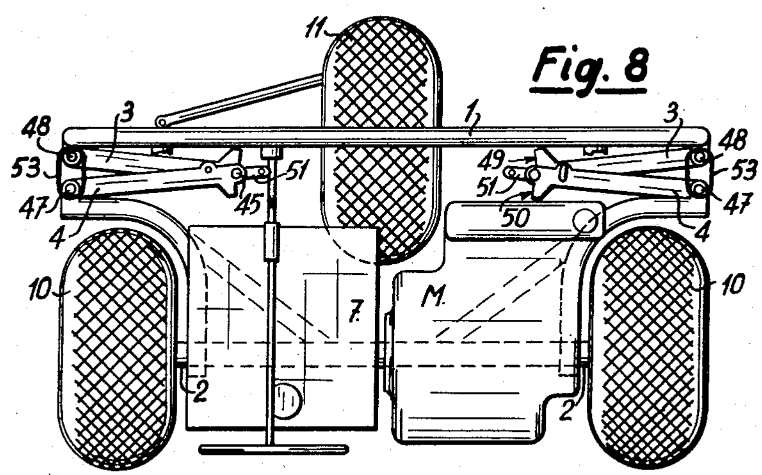
INVENTOR
NICHOLAS PETER SORRELL STRAUSSLER
BY Irwin S. Thompson
ATTY.

COLLAPSIBLE MOTOR VEHICLE

INVENTOR
NICHOLAS PETER
SORRELL STRAUSSLER
BY Irwin S. Thompson
ATTY.

COLLAPSIBLE MOTOR VEHICLE
Filed Nov. 17, 1958 6 Sheets-Sheet 6
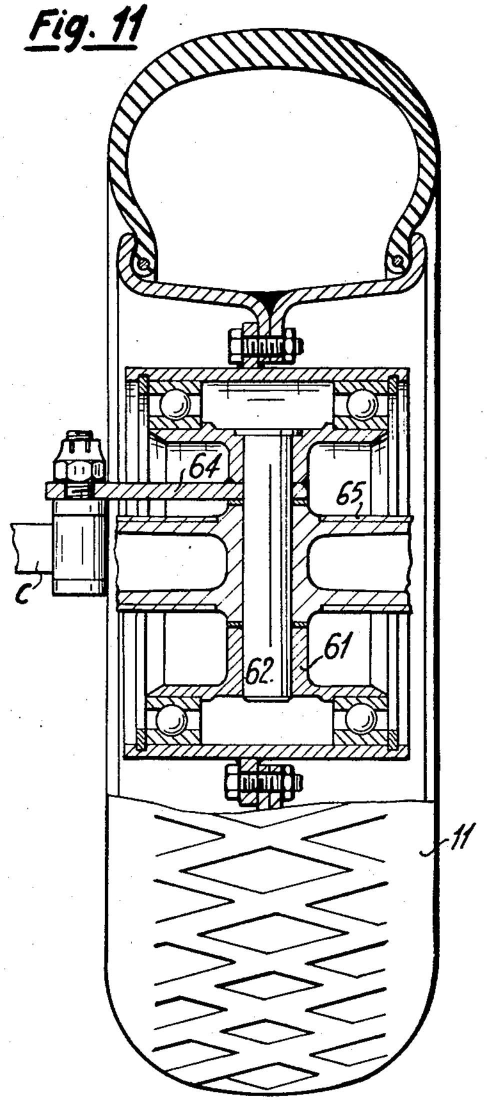
INVENTOR
NICHOLAS P. S. STRAUSSLER
BY Irvin S. Thompson
ATTY.

United States Patent Office

3,004,619
Patented Oct. 17, 1961

1

3,004,619
COLLAPSIBLE MOTOR VEHICLE
Nicholas Peter Sorrell Straussler, 5 Clarges St., London, England
Filed Nov. 17, 1958, Ser. No. 774,206
8 Claims. (Cl. 180—27)

The present invention has for its object a collapsible motor vehicle comprising a chassis carrying an engine mechanically connected to two driving wheels, a seat and at least one front wheel. The said vehicle is characterized by the fact that the chassis includes two side-members each constituted by at least a front section and a rear section capable of being moved one with respect to the other, by the fact that the seat is hinged relatively to the chassis so as to permit of folding the latter, by the fact that the engine is fastened on a cross-bar connecting the rear ends of the rear sections of the side-members, and by the fact that locking devices secure two relative positions of the sections of said side-members, the one corresponding to a collapsed position and the other to a running position of the vehicle.

The accompanying drawing shows diagrammatically and by way of example four embodiments of the vehicle, object of the invention:

FIG. 1 is a profile view in the open or running position of the vehicle according to the first form of execution.

FIG. 2 is a plan view.

FIG. 3 is a profile view of the vehicle in the collapsed position.

FIG. 4 is a plan view of the vehicle in the collapsed position.

FIGS. 7 and 8 are plan views of the third form of execution of the vehicle in the running position and the collapsed position, more particularly FIG. 8 is a broken-away view with parts omitted.

FIG. 11 is a partial cross section of the front wheel through a vertical diametral plane.

Figure 5:
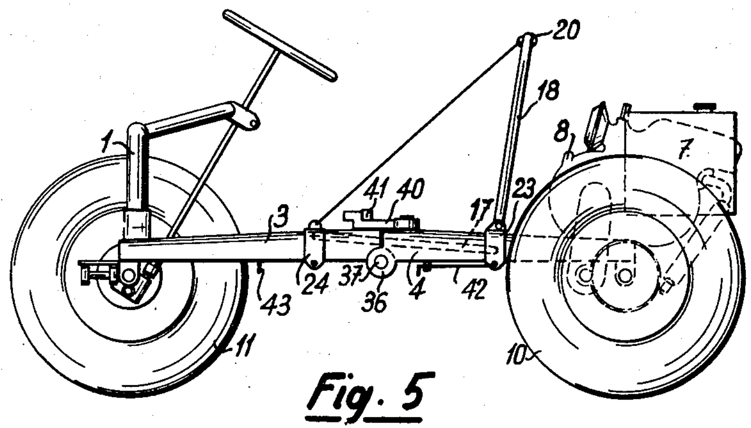
FIGS. 5 and 6 are side views of the second form of execution of the vehicle in the running position and the collapsed position.

According to the FIGS. 1 to 4 of the accompanying drawing, the vehicle is provided with a chassis including two cross-bars 1, 2, rigidly connecting the front and rear ends of two side-members each constituted by two sections 3, 4 sliding one with respect to the other. The front ends of the front sections 5 of the side-members are rigidly connected one with the other by the cross-bar 1 while the rear ends 6 of the side-members are rigidly connected by the cross-bar 2. The latter carries the engine M, the fuel tank 7, the change-speed gear 8 and the differential 9 connected to the rear driving wheels 10 by driving shafts housed inside the cross-bar 2, constituted by a tube. The front part of the vehicle is further provided with a front wheel 11, situated in the longitudinal symmetry plane of the chassis and mechanically connected by a control device *c* to a steering wheel 12.

In the preferred form of construction the whole assembly of the steering wheel 12, the front axle 65, the steering device and the steering wheel, is connected to the side members 3 by means of couplings 66 sliding on said side members. The position of these couplings 66 with respect to the side members can be fixed by means of pins 68 cooperating with holes made in the couplings and in the side members in two different positions, the one corresponding to the running position

2

(FIGS. 1 and 2), the other to the collapsed position (FIGS. 3 and 4) of the vehicle.

The front and rear sections of each side-member are engaged in a guiding member 13 and are movable one with respect to the other from an open position (FIGS. 1 and 2), defined by a pin 14 engaged in bores, made in each side-member section and in the guiding member, to a collapsed position (FIGS. 3 and 4) defined by the said pin 14 engaged in bores made in the front and rear sections of the side-members.

A seat 15 is disposed between the said two side-members and between the front wheel and the engine (FIGS. 1 and 2). The said seat comprises a cloth 16 stretched on two frames 17 and 18, hinged one with respect to the other. In the running position (shown in FIGS. 1 and 2), the relative angular position of the said two frames 17 and 18 is determined by two cables 19, connecting the upper side 20 of the frame 18 which forms the back, to the front side 21 of the frame 17 which forms the seat itself. The rear side 22 of the frame 17 is provided with two supporting members 23 which, in the running position, bear on the rear sections of the side-members. The front side 21 of the frame 17 also carries two supporting members 24 which, in the running position, bear on the front sections of the side-members.

The lower side 25 of the frame 18 is hinged by its two ends at 26 to the supporting members 23. Each supporting member 23 is connected by a tie-rod 27 to the chassis of the vehicle. One of the ends of each of the said tie-rods 27 is hinged at 28 to the rear end of a side-member while the other end of each tie-rod is hinged at 29 to one of the supporting members 23. The upper end of the column 30 of the steering wheel 12 is engaged in a guide 32 constituted by a collar carried by the front cross bar 1 of the vehicle chassis, and the lower end of said column 30 is connected by means of a joint coupling 35, 36 to the shaft 31 of a rack and pinion drive 63, the rack of which is fixed to the control device *c* which is fastened to the actuating member 64 of the front wheel 11. The front wheel hub 61 is articulated on the wheel axle 65 by means of a pin 62.

The operation of the vehicle described is the following:

In the running position (FIGS. 1 and 2), the two side-members are stretched, their relative positions being determined, on the one hand, by abutments 33 rigidly fastened to the rear end of the front sections and to the front end of the rear sections of the side-members and co-operating with the two front faces 34 of each guiding members 13 and, on the other hand, by the pins 14 engaged in bores made in the side-members and in the guiding members 13. When the front wheel is set in its running position, FIGS. 1 and 2, couplings 66 are located against the front ends 5 of the side members 3 and are fixed to them by means of the pins 68. The seat 15 rests, through the agency of its supporting members 23 and 24, on the side-members, the frame 18 being held approximately in a position perpendicular to the frame 17 by the cables 19. The steering wheel 12 is held in the raised position, its column being engaged in the guide 32, and a coupling device 35, 36 ensures the mechanical connection between the column 30 of the steering wheel and the control device *c* for turning the front wheel 11.

When the vehicle is to be loaded on a railway wagon or on a lorry or in an airplane with a view to its transport over a long distance, the back of the seat 18 is folded down on the frame 17, and then the seat is lifted to an approximately vertical position. By means of a traction *f*, exerted on the steering wheel 12, the loosening of the two parts of the coupling 35, 36 is brought about and after having opened the collar 32, the wheel is collapsed into a position in which its column is approximately horizontal (FIG. 3). The seat is then made to pivot about its hinges 29, so as to bring it into a lifted position.

The two pins 14 are then withdrawn, and then a thrust is exerted on the chassis so as to cause the front and rear sections of the side-members to slide in their guides 13 until, on the one hand, the rear ends 6 come against the guiding members 13 and, on the other hand, the ends 33 of the side members 3 are situated approximately in a vertical plane tangent to the rear surfaces of the rear wheels 10. Then the front wheel set slides along the side members 3 until the two couplings 66 come against the guiding members 13, which brings the front wheel 11 in contact with the rear cross bar 2.

In that position, the front ends of the rear sections of the side members, the front side of the front wheel, and the front cross bar 1 are located approximately in a same vertical plane. By means of the pins 68 the couplings 66 are locked in position on the side members 3. By means of the pins 14, the front and rear sections of the side-members are locked in this relative position (FIGS. 3 and 4). Finally the frame 17 is brought to bear against the tyre of the front wheel.

It is to be noted that in this collapsed position of the chassis, the vehicle may still be rolled along the ground thus greatly facilitating its loading and unloading as well as its parking in a storage building.

Figure 6:
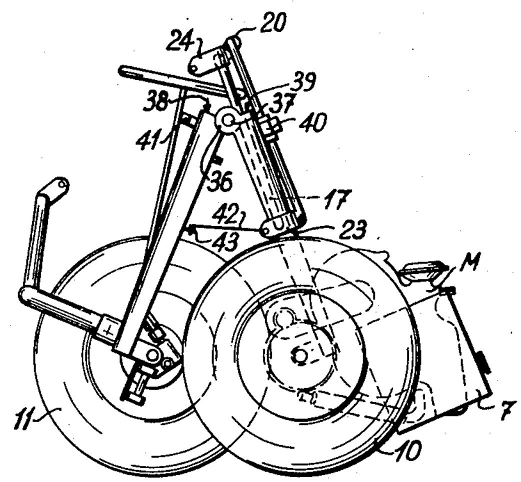

In the second form of execution of the vehicle shown in FIGS. 5 and 6, the front and rear sections 3 and 4 of the two side-members of the chassis are hinged one to the other. To this end, the said front and rear sections of each side-member are connected one to the other by a hinge 36 of which the spindle 37 is parallel to the axes of rotation of the rear wheels 10 and of the front wheel 11.

The operating position of the chassis permitting normal running of the vehicle is defined by the front faces 38 and 39 of the front and rear sections 3 and 4 of each of the side-members which abut one against the other.

A locking device, constituted by two levers 40 each hinged on the rear section of one of the side-members and two catches 41 fastened to the front sections of the said side-members and into which engage the said levers, secures the operating position of the chassis and retains the front and rear sections of each of the side-members in the operating position (FIG. 5) during the running of the vehicle.

The seats are of the same type as those described with reference to FIGS. 1 to 4. The said seats are disposed astride the front and rear sections of the two side-members, and are supported on the said side-member sections by means of the supporting members 23, 24. However, the supporting members 23 are each rigidly secured to the rear section of the corresponding side-member.

In order to collapse the vehicle, it is sufficient to free the two levers 40 of the locking devices, and then to bring the front wheel 11 and the rear wheels 10 near one another into the position shown in FIG. 6. A holding back device constituted on the one hand by two rods 42 hinged each to one of the supporting members 23 and provided at their free end with a hook, and on the other hand, by two corresponding eyelets 43 each integral with one of the front sections of said side-members, permits of maintaining and locking the chassis in the collapsed position.

In the third form of execution shown in FIGS. 7 and 8, the front and rear sections 3 and 4 of the side-members are hinged one to the other by means of a hinge 44, the spindle 45 of which is perpendicular to the axes of rotation of the wheels 10 and 11 of the vehicle. Moreover, the rear end of each rear section 4 of the two side-members is hinged through the agency of a spindle 47 parallel to the spindle 45 on an arm 46 rigidly fastened to the rear cross-bar 2, while the front end of each front section 3 of the side-members is hinged through the agency of a spindle 48 parallel to the spindle 45 on one of the ends of the front cross-bar 1.

The operating position (FIG. 7) of the chassis is determined by two abutment faces 49 and 50 respectively integral with the front and rear sections 3 and 4 of the side-members of the chassis.

A locking device constituted by two lugs 51 and two pins 52 engaged in bores made in the said lugs and in the front sections 3 of the side-members, secures the operating position of the chassis. Small bars 53 provided with a bore at each of their ends engaged on the ends of the spindles 48 and 47 hold the chassis in the collapsed position shown in FIG. 8.

The supporting members 23 of the seats bear on the rear sections 4 of the side-members and are each carried by a bent tie-rod 27' hinged to the rear cross-bar 2, so as to permit of raising the seats as described with reference to FIGS. 1 to 4 with a view to freeing sufficient space for the passage of the front wheel 11 when the vehicle is collapsed. In the fourth form of execution shown in FIGS. 9 and 10, the front and rear sections 3 and 4 of each of the two side-members are connected one to the other by means of an intermediate section 54. Each end of said intermediate section presents a U-shaped recess 55, 56.

The rear end of the front section 3 is engaged in said recess 55 and hinged to the intermediate section 54 by means of an axle 57 rigidly fastened in the walls of said recess 55 and traversing a bore made in said rear end of said front section.

The front end of the rear section 4 is engaged in said recess 56 and hinged to said intermediate section 54 by means of an axle 58 rigidly fastened in the walls of said recess 55 and crossing a bore made in said front end of said rear section.

The back frame 18 of the seats as well as the seat frame 17 are hinged at 26 on the supporting members 24 which bears on said two rear sections 4. The seat frame 17 is fastened to the supporting members 23 which bear on the fore end of the intermediate sections 54.

Figure 9:
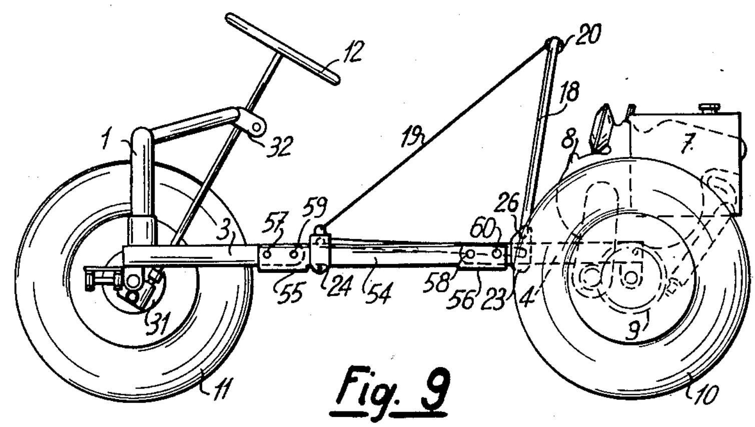
FIGS. 9 and 10 are side views of the fourth form of execution of the vehicle in the running position and the collapsed position.

In the running position of the chassis represented by FIG. 9, the three sections of each side-member are locked the one with respect to the other by means of two spindles 59, 60 engaged into holes made in the walls of the recess 55, 56 and in the sections 3 and 4.

Figure 10:
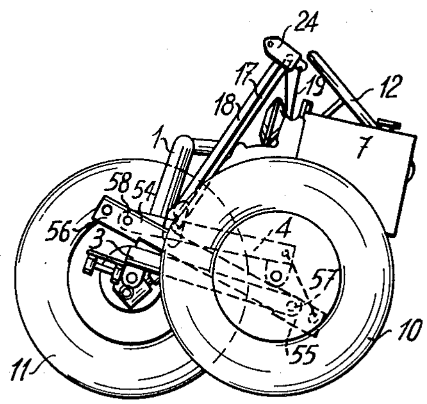

In order to collapse the chassis the user takes away the said two locking spindles 59, 60 and brings the rear wheels 10 near the front wheel 11 until the position illustrated on FIG. 10 for which each of the side-members is folded as illustrated and the frames 17 and 18 of the seat are lifted as shown.

From the preceding and from an examination of the accompanying drawings, it is easy to understand the very great simplicity of the collapsible operations of the vehicle and the resuming of the running condition. The length of the vehicle in the collapsed or telescoped position is about equal to one-half only of the length of the vehicle in the running position, representing a very great advantage for storage and transport.

As shown, the driving wheels as well as the front wheel are equipped with tyres of relatively small diameter, but which have, on the other hand, a very great width so as to adhere firmly to the ground and thus produce an all surface vehicle, of outstanding use.

I claim:

1. A collapsible motor vehicle comprising a chassis having cross members and side members, one of said cross members carrying drive wheels and the other cross member carrying a steering wheel, a steering column and coupling connection from said steering column to said steering wheel, a seat arranged on said side members, a motor in said chassis connected to said drive wheels, each said side member having movable sections connecting said cross members, guide means mounted on the side members to enable said movable sections to slide one with respect to the other, coupling means mounted on one of said movable sections to enable one of the cross members and one of the movable sections of each of said side members to slide one with respect to the other, and locking means rigidly fixing the movable sections of each side member in a running position of said vehicle, whereupon disengaging said locking means enables said vehicle to be arranged in a collapsed condition with the steering wheel touching the cross member of the drive wheels.

2. A vehicle according to claim 1 in which said guide means encompass said movable sections and said locking means are associated with said guide means to lock said vehicle in a running position and a collapsed position.

3. A vehicle according to claim 1 in which said coupling means comprises coupling members connected to said cross member carrying said steering wheel and encompassing the movable sections of each of said side members, and further locking means to lock said coupling members to said movable sections.

4. A vehicle according to claim 1 in which said seat has supporting members removably engaging said side members, and tie rods connected between said supporting members and said chassis for moving said seat from an operating position to an inoperative position.

5. A collapsible motor vehicle comprising a chassis having cross members and side members, one of said cross members carrying drive wheels and the other cross member carrying a steering wheel, a steering column and coupling connection from said steering column to said steering wheel, a seat arranged on said side members, said seat having supporting members removably engaging said side members and tie rods connected between said supporting members and said chassis for moving said seat from an operating position to an inoperative position, a motor in said chassis connected to said drive wheels, each said side member having movable sections connecting said cross members, guide means encompassing said movable sections to enable said movable sections to slide one with respect to the other, coupling members connected to one of said cross members and encompassing said movable sections to enable said cross member to move with respect to said movable sections, locking means rigidly fixing said movable sections in a running position and an inoperative position, and further locking means rigidly fixing the one of said cross members having the coupling members thereon in a running position and an inoperative position.

6. A vehicle according to claim 5 in which the one of said cross members having the coupling members thereon carries said steering wheel, and said further locking means rigidly fixes said cross member carrying said steering wheel in a running position or an inoperative position.

7. A collapsible motor vehicle comprising a chassis having cross members and side members, one of said cross members carrying drive wheels and the other cross member carrying a steering wheel, a steering column and coupling connection from said steering column to said steering wheel, a seat arranged on said side members, a motor in said chassis connected to said drive wheels, each said side member having movable sections connecting said cross members, coupling means mounted on one of said movable sections to enable one of the cross members and one of the movable sections of each of said side members to slide one with respect to the other, and locking means rigidly fixing the movable sections of each side member in a running position of said vehicle, whereupon disengaging said locking means enables said vehicle to be arranged in a collapsed condition with the steering wheel touching the cross member of the drive wheels.

8. A collapsible motor vehicle comprising a chassis having cross members and side members, one of said cross members carrying drive wheels and the other cross member carrying a steering wheel, a steering column and coupling connection from said steering column to said steering wheel, a motor in said chassis connected to said drive wheels, each said side member having movable sections connecting said cross members, coupling means mounted on one of said movable sections to enable one of the cross members and one of the movable sections of each of said side members to slide one with respect to the other, locking means rigidly fixing the movable sections of each side member in a running position of said vehicle, whereupon disengaging said locking means enables said vehicle to be arranged in a collapsed condition with the steering wheel touching the cross member of the drive wheels, and a seat arranged on said side members, said seat being formed by two frames hinged one with respect to the other, one forming the seat and one forming the back, a cloth stretched on said frames, and bars hinged to said chassis and said back frame enabling the lifting of said seat when collapsing the vehicle.

References Cited in the file of this patent

UNITED STATES PATENTS

| | | |
|---|---|---|
| 535,126 | Wilcox | Mar. 5, 1895 |
| 873,711 | Bruen | Dec. 17, 1907 |
| 2,488,123 | Hartry | Nov. 15, 1949 |
| 2,510,798 | Cahill | June 6, 1950 |
| 2,536,749 | Jenner et al. | Jan. 2, 1951 |
| 2,571,282 | Newton et al. | Oct. 16, 1951 |
| 2,583,358 | Cesan | Jan. 22, 1952 |
| 2,696,272 | Schlaphoff | Dec. 7, 1954 |
| 2,798,568 | Zeller | July 9, 1957 |

FOREIGN PATENTS

| | | |
|---|---|---|
| 963,323 | France | Dec. 26, 1949 |
| 687,794 | Great Britain | Feb. 18, 1953 |